US012187592B2

(12) United States Patent
Marchesi et al.

(10) Patent No.: US 12,187,592 B2
(45) Date of Patent: Jan. 7, 2025

(54) APPARATUS FOR CAPPING CONTAINERS

(71) Applicant: SACMI BEVERAGE S.P.A., Imola (IT)

(72) Inventors: Luigi Marchesi, Collecchio (IT); Enrico Cocchi, Parma (IT); Mirco Massari, Parma (IT)

(73) Assignee: SACMI BEVERAGE S.P.A., Imola (IT)

(*) Notice: Subject to any disclaimer, the term of this patent is extended or adjusted under 35 U.S.C. 154(b) by 0 days.

(21) Appl. No.: 18/163,598

(22) Filed: Feb. 2, 2023

(65) Prior Publication Data

US 2023/0242389 A1 Aug. 3, 2023

(30) Foreign Application Priority Data

Feb. 2, 2022 (IT) ........................ 102022000001742

(51) Int. Cl.
*B67B 3/20* (2006.01)

(52) U.S. Cl.
CPC ............ *B67B 3/202* (2013.01); *B67B 3/2073* (2013.01)

(58) Field of Classification Search
CPC ..... B67B 3/2073; B67B 3/202; B67B 3/2033; B67B 3/26
See application file for complete search history.

(56) References Cited

U.S. PATENT DOCUMENTS 3,254,406 A * 6/1966 Hubrich .................... B67B 7/38 30/410
5,400,564 A * 3/1995 Humphries ............... B67B 3/26 53/308
6,874,301 B2 * 4/2005 Kitamoto .................. B67B 3/26 53/484
6,948,297 B2 * 9/2005 Kitamoto ............. B67B 3/2093 53/317

(Continued)

FOREIGN PATENT DOCUMENTS

DE 19946374 A1 * 3/2001 ........... B67B 3/2033
DE 202015106572 U1 * 4/2017

(Continued)

OTHER PUBLICATIONS

Italian Search Report and Written Opinion for Italian Application No. 202200001742, Dated Oct. 5, 2022, 11 pages.

(Continued)

*Primary Examiner* — Andrew M Tecco
(74) *Attorney, Agent, or Firm* — CANTOR COLBURN LLP

(57) ABSTRACT

An apparatus for capping containers includes, at least one capping head which is moveable between a position for picking up a cap and a position for applying the cap at a neck of a container, the grip element defining a receptacle for the cap and component for the removable retention of the cap within the receptacle; A second motor component is provided to actuate the movement of the grip element in an axial direction. The apparatus also includes a control and actua- (Continued)

tion unit functionally connected to the first and second motor components and is configured to receive in input a number of data items; The control and actuation unit is configured to actuate the first and second motor components as a function of the variation of the value over time of the number of data items.

12 Claims, 11 Drawing Sheets

(56) References Cited

U.S. PATENT DOCUMENTS 7,024,837 B2 * 4/2006 Takebe ...................... B67B 3/26 53/317
7,987,652 B2 * 8/2011 Corniani ............... B67B 3/2086 53/317
8,915,052 B2 * 12/2014 Dewert ..................... B67B 3/26 53/317
2001/0018820 A1 * 9/2001 Kitamoto .................. B67B 3/20 53/331.5
2011/0083405 A1 * 4/2011 Dewert ..................... B67B 3/26 53/317

FOREIGN PATENT DOCUMENTS

EP 2311773 A1 4/2011
WO WO-0240391 A1 * 5/2002 ............. B67B 3/064

OTHER PUBLICATIONS

European Extended Search Report for European Application No. 23154294.5, dated Jun. 30, 2023, 10 pages.

* cited by examiner

APPARATUS FOR CAPPING CONTAINERS

CROSS-REFERENCE TO RELATED APPLICATIONS

This application claims the benefit of Italian patent application 102022000001742. Filed on Feb. 2, 2022, the contents of which are incorporated herein by reference in its entirety.

TECHNICAL FIELD

The present disclosure relates to an apparatus for capping containers and to a method for capping containers.

BACKGROUND

Apparatuses for capping containers comprise, typically, one or more capping heads, which can move along an axis that is vertical in use, and which are provided with a grip element for gripping the cap which is constituted by a tubular body, with a lower opening which is adapted to receive the cap, the tubular body of which is designed to retain the cap. At the opposite end with respect to the lower opening, there is an ejector, constituted for example by a rod, which can slide along the vertical axis.

Normally, each capping head is associated with a movement assembly which is configured to also impart, in addition to the translation movement along the axis, a rotary motion of the tubular body in order to screw the cap onto the threading defined at the mouth of the container.

Typically, capping apparatuses have a carousel structure, with a plurality of heads which operate by moving along the peripheral region of the carousel together with the elements for supporting the containers to be capped.

While each head and the corresponding container arranged below it are moving along the perimeter of the carousel, the capping head, which was previously loaded with a cap, is lowered and rotates, in so doing screwing the cap onto the neck of the container, and is then returned to a raised position. If the screwing is not carried out, for example owing to the bottle being missing or owing to an incorrect positioning of the cap within the head, the cap needs to be ejected before the head arrives in the pickup position in order to execute a new cycle.

In the known solutions, as previously mentioned, a stem ejector is used which is mounted so that it can slide in the axial direction in order to pass through the head. In the known solutions, both the raising/lowering of the head and the axial movement of the ejector are obtained by coupling respective rollers with a cam-like profile.

The means normally used to move the head in rotation about its own axis, so as to enable the screwing of the cap onto the neck of the bottle, can be various, and usually they are constituted by actuation motors.

The grip elements of the screwing heads define, internally thereto, means for retaining the cap to be screwed.

The most-used solution for providing the retention means consists in using a plurality of balls arranged inside the tubular body, and one or more elastic rings arranged outside the balls.

The balls protrude through respective openings defined on the internal surface of the tubular body so as to be kept pressed against the side wall of the cap by virtue of the action of the elastic rings.

Basically, when the screwing head is lowered over a cap, which is carried for example by a loading disk, in order to pick it up, the cap enters the seat defined by the tubular body, defeating the contrasting action of the elastic rings, and is retained inside the seat by virtue of the action of the elastic rings that push the balls against the side wall of the cap.

Known solutions, although widely used, are not however devoid of drawbacks.

Firstly, with reference to the retention means, it should be noted that the use of balls or of pressing means in general can, in some circumstances, deform the cap, thus determining possible problems in its application to the container.

This aspect takes on increasing importance given the tendency to reduce ever further the weight and the thickness of the caps used.

It has furthermore been found that the environmental conditions or the storage conditions of the caps also influence the correctness of the capping operations and that, as a consequence, the plants in use today cannot be adapted to different environmental conditions, since the operating parameters (in terms of tightening torque, vertical thrust, pressure of the balls on the outer surface of the cap etc.) are fixed and non-adjustable.

SUMMARY

The aim of the present disclosure is to provide an apparatus for capping containers that is capable of avoiding the drawbacks of the known art in one or more of the above mentioned aspects.

Within this aim, the disclosure provides an apparatus for capping containers that can be adapted to the environmental conditions, thus reducing the risk of damaging the caps.

The disclosure also provides an apparatus for capping containers in which the capping cycle is independent of the rotation speed of the capping turret, so as to have capping parameters that are independent of the production speed of the plant.

The disclosure further provides an apparatus for capping containers that is highly reliable, easy to implement and of low cost.

This aim and these and other advantages which will become more apparent hereinafter are achieved by providing an apparatus for capping containers according to claim 1, optionally provided with one or more of the characteristics of the dependent claims.

BRIEF DESCRIPTION OF THE DRAWINGS

Further characteristics and advantages of the disclosure will become better apparent from the description of some preferred, but not exclusive, embodiments of the apparatus for capping containers according to the disclosure, which are illustrated for the purpose of non-limiting example in the accompanying drawings wherein.

DETAILED DESCRIPTION OF THE DRAWINGS

Figure 1:
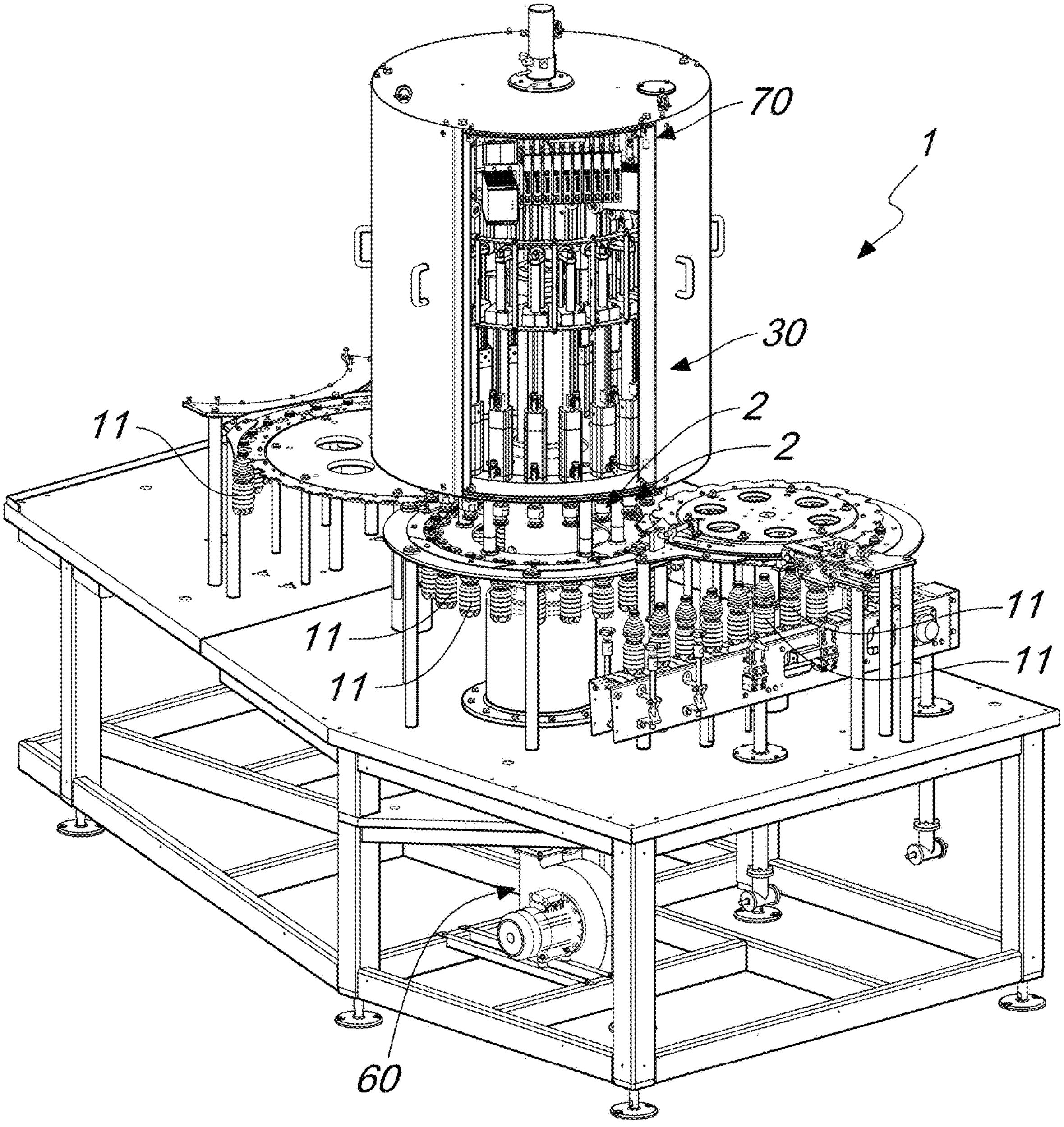
FIG. 1 is a perspective view of an apparatus for capping containers according to the disclosure.
Figure 2:
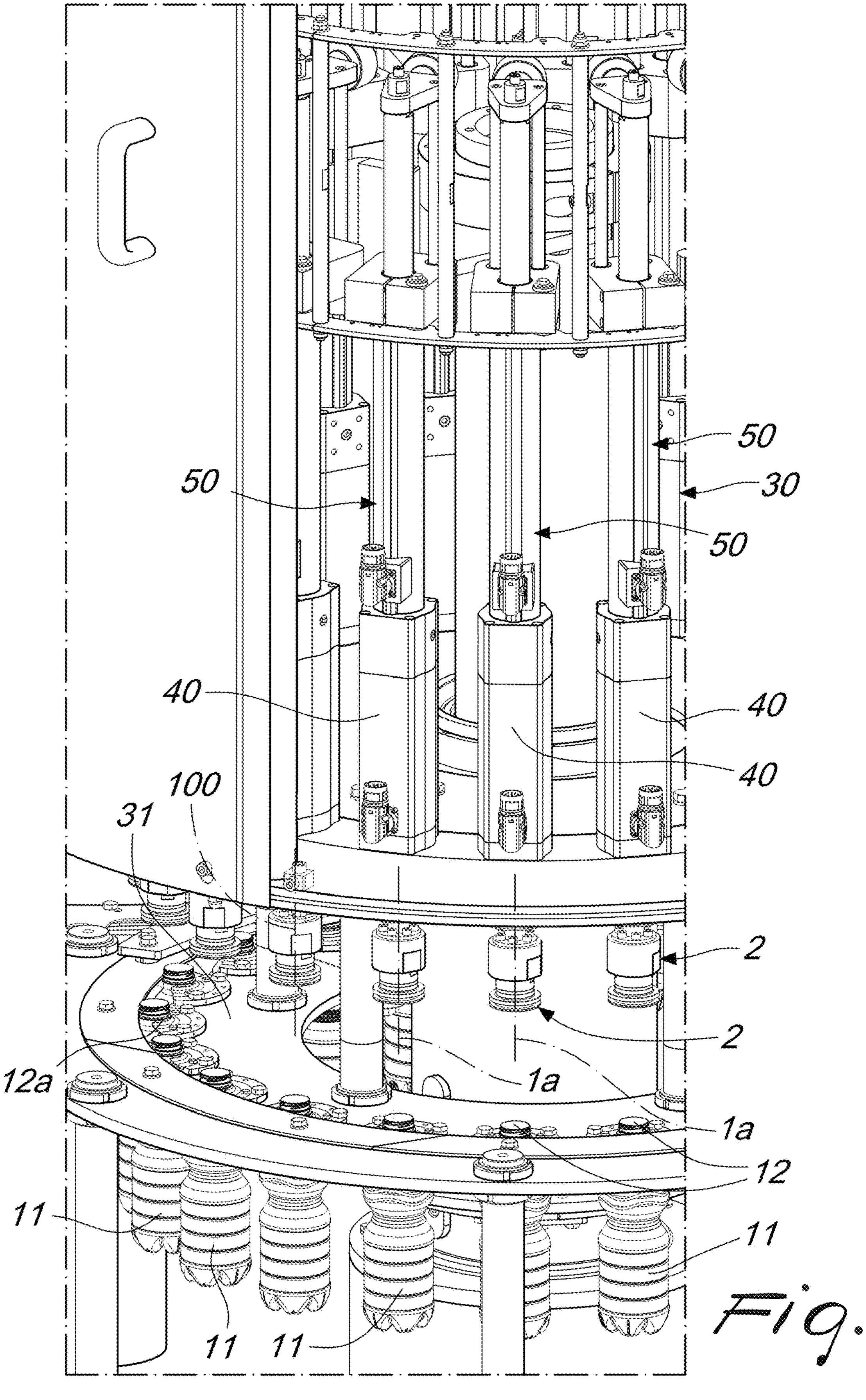
FIG. 2 is an enlargement of a portion of the apparatus of FIG. 1.
Figure 3:
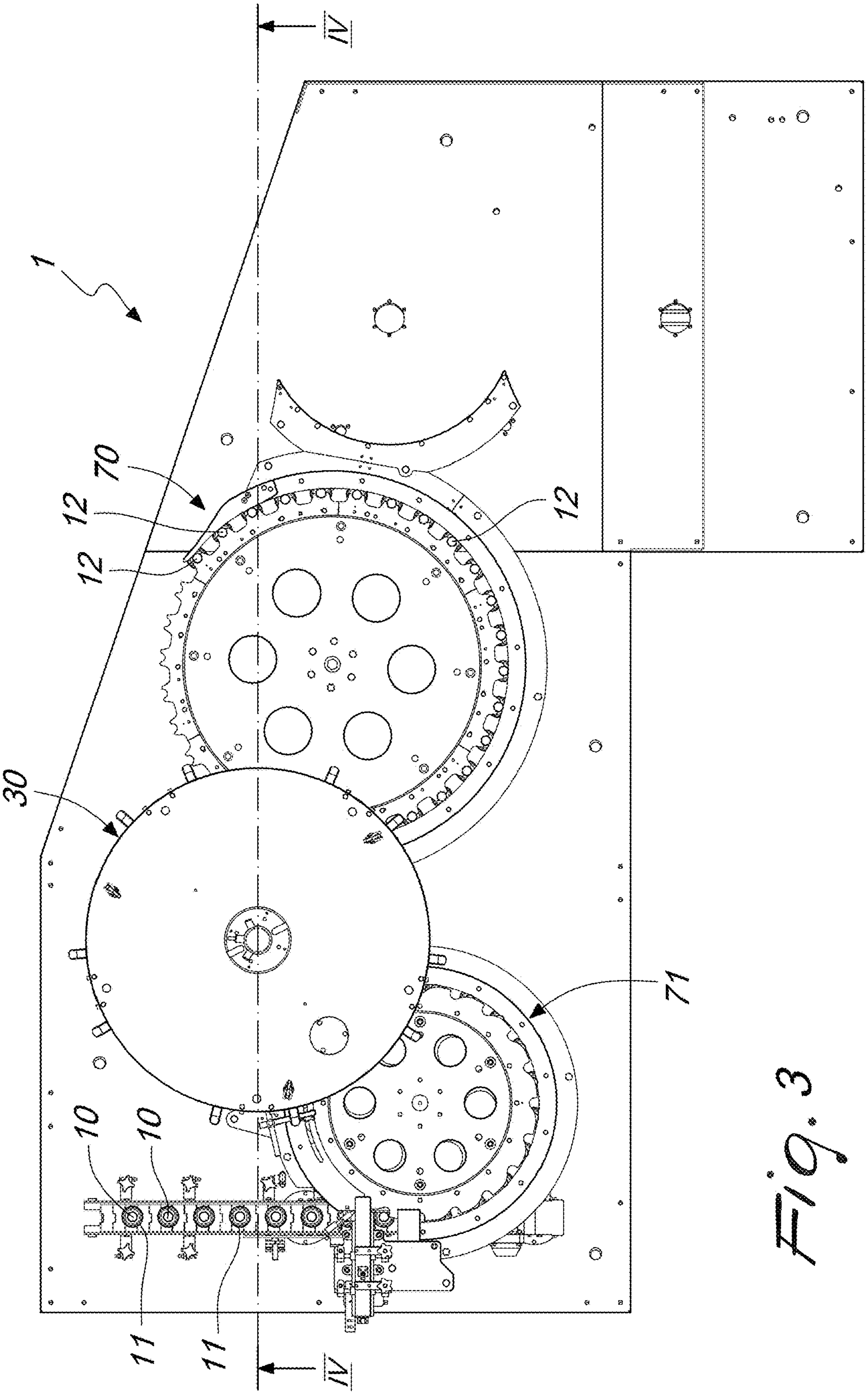
FIG. 3 is a view from above of the apparatus of FIG. 1.
Figure 4:
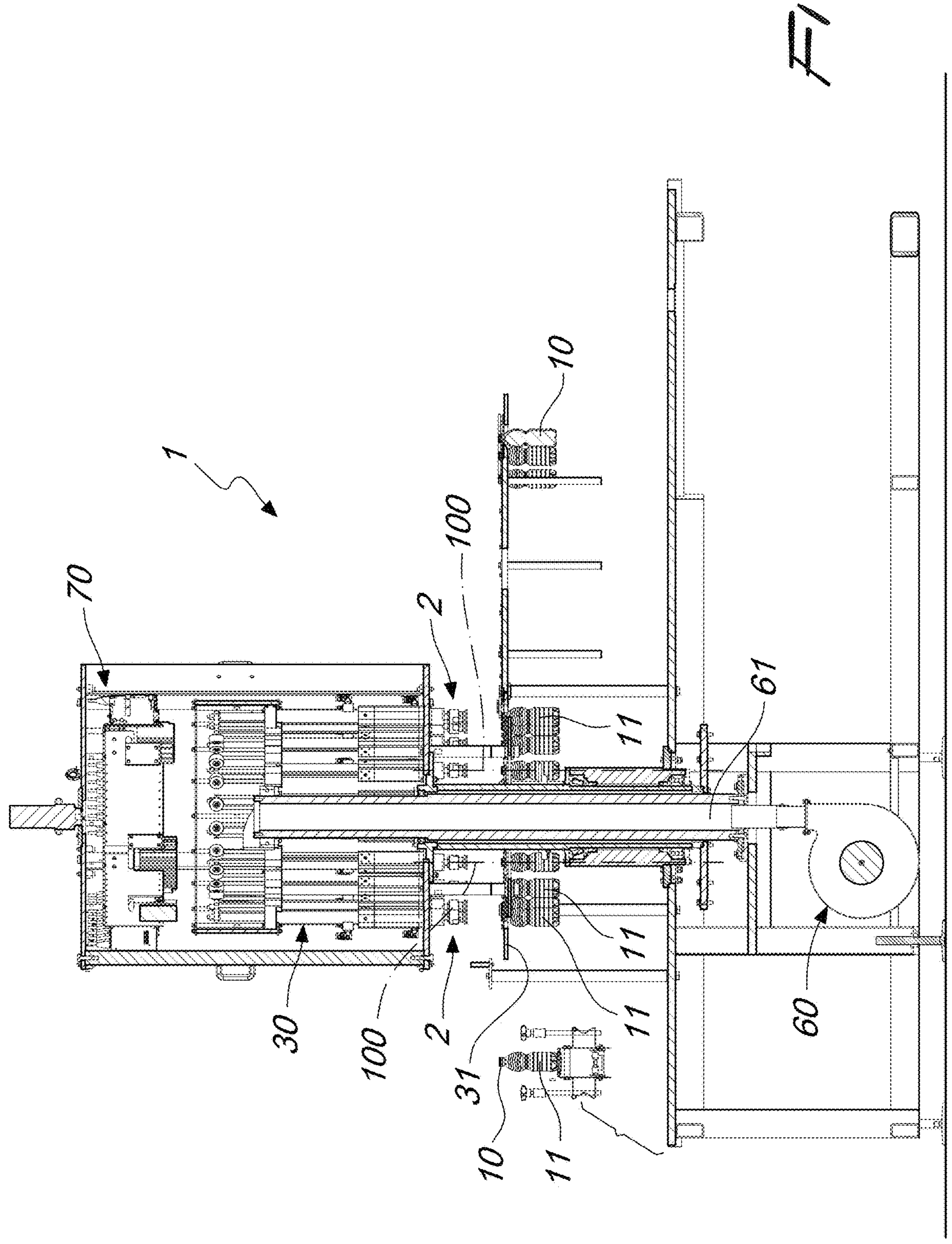
FIG. 4 is a cross-sectional view of the apparatus of FIG. 2, taken along the line IV-IV of FIG. 3.
Figure 6:
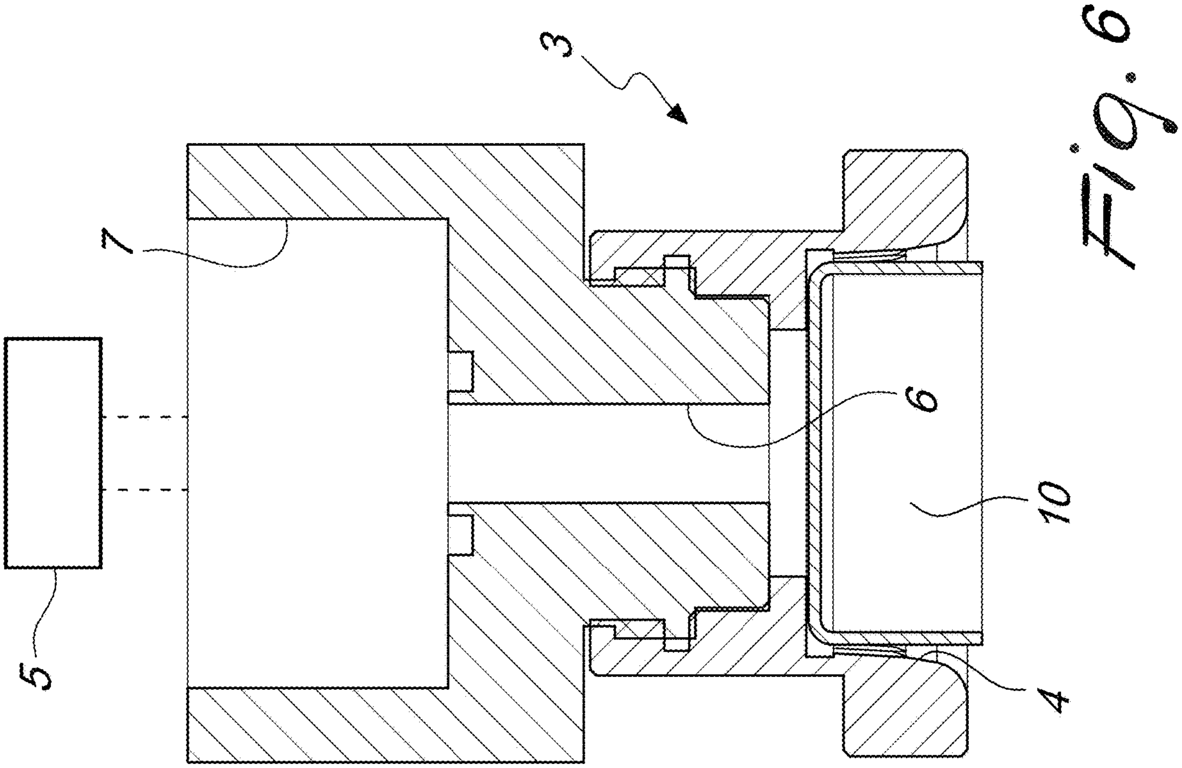
FIG. 6 is a cross-sectional view taken along the line VI-VI of FIG. 5.
Figure 5:
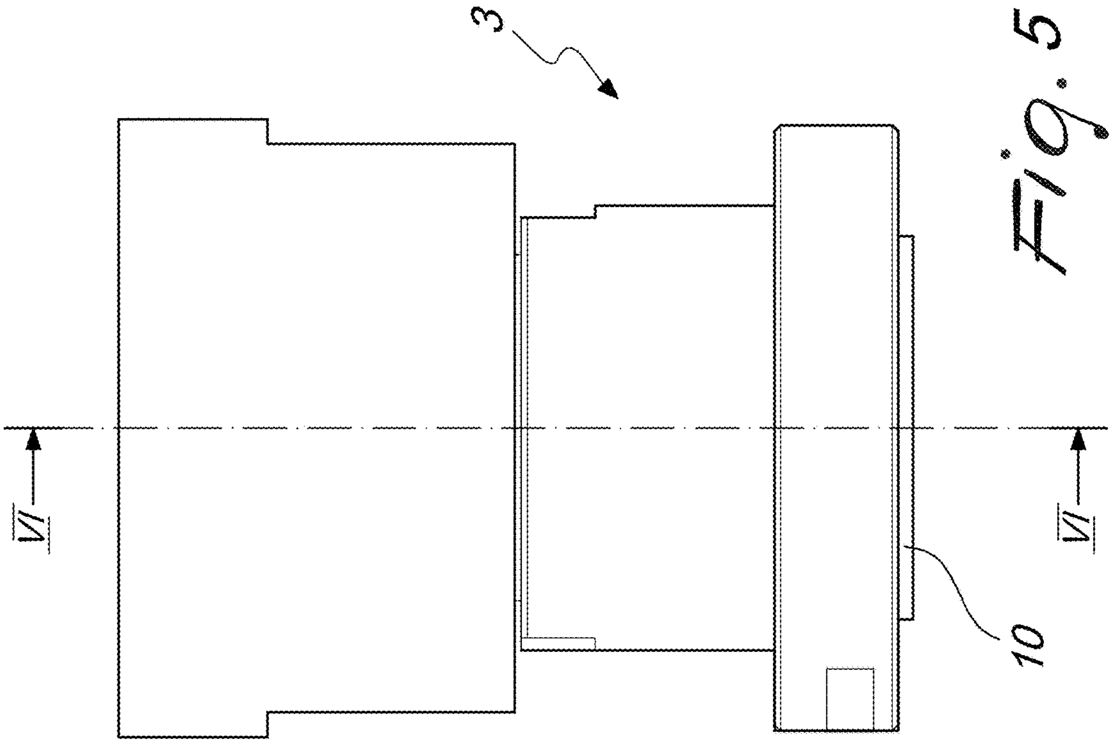
FIG. 5 is a side view of a grip element associated with a cap correctly.
Figure 8:
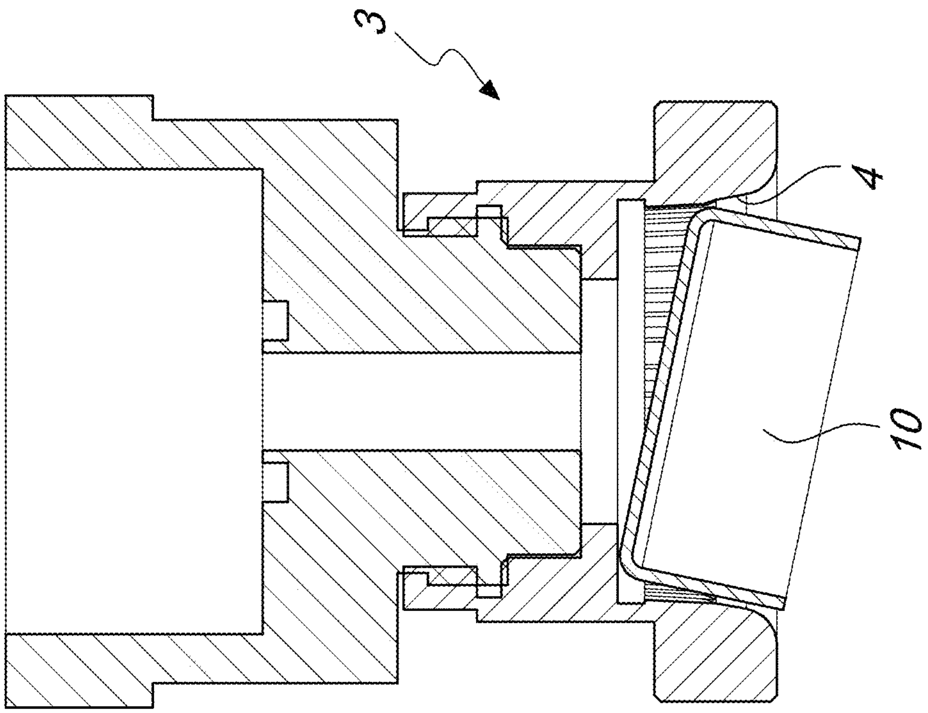
FIG. 8 is a cross-sectional view taken along the line VIII-VIII of FIG. 7.
Figure 7:
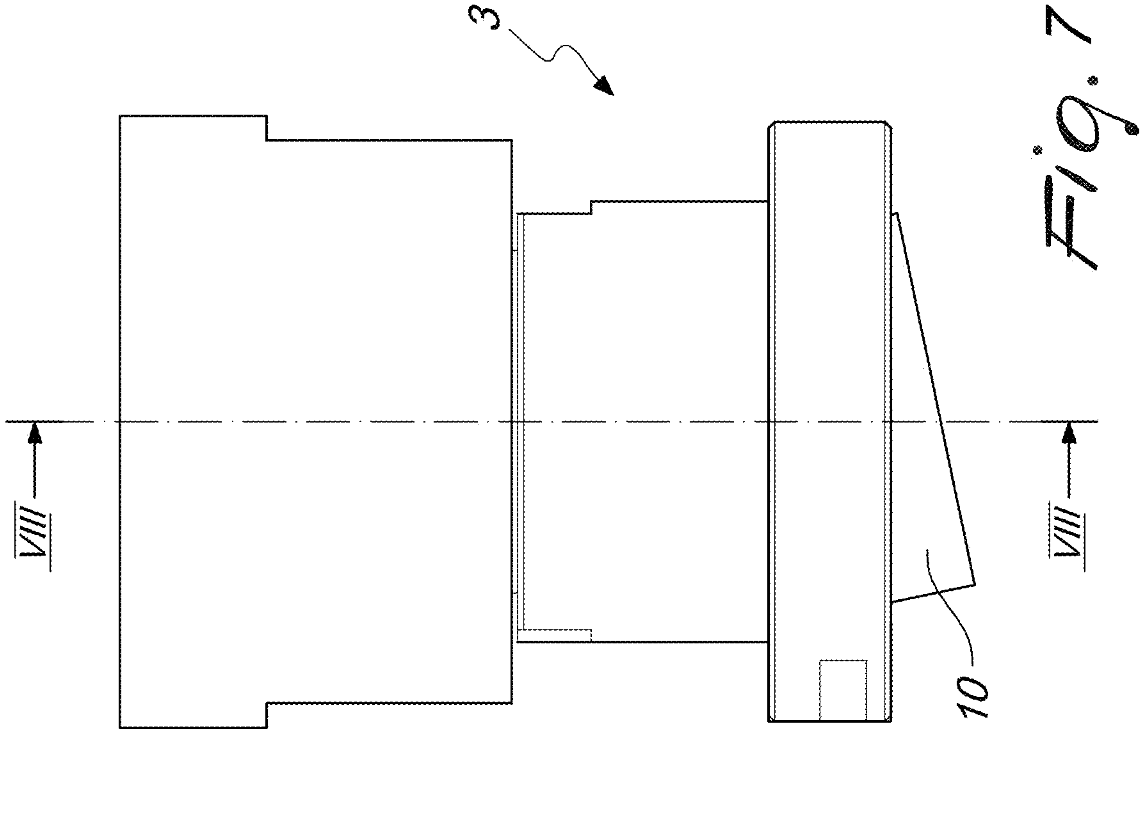
FIG. 7 is a side view of a grip element associated with a cap incorrectly.
Figure 9:
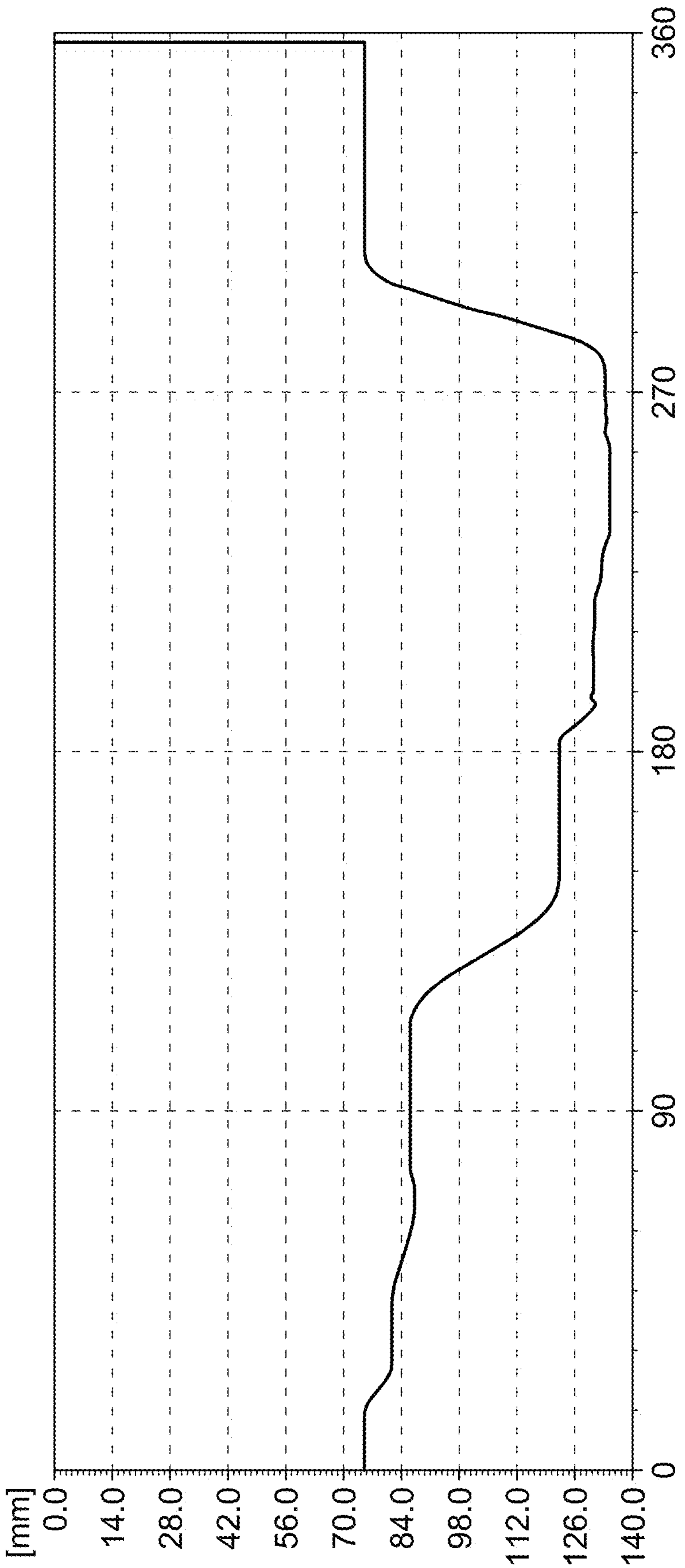
FIG. 9 shows the variation of the position along the vertical axis of the receptacle as a function of the angular position about the rotation axis of the carousel.
Figure 10:
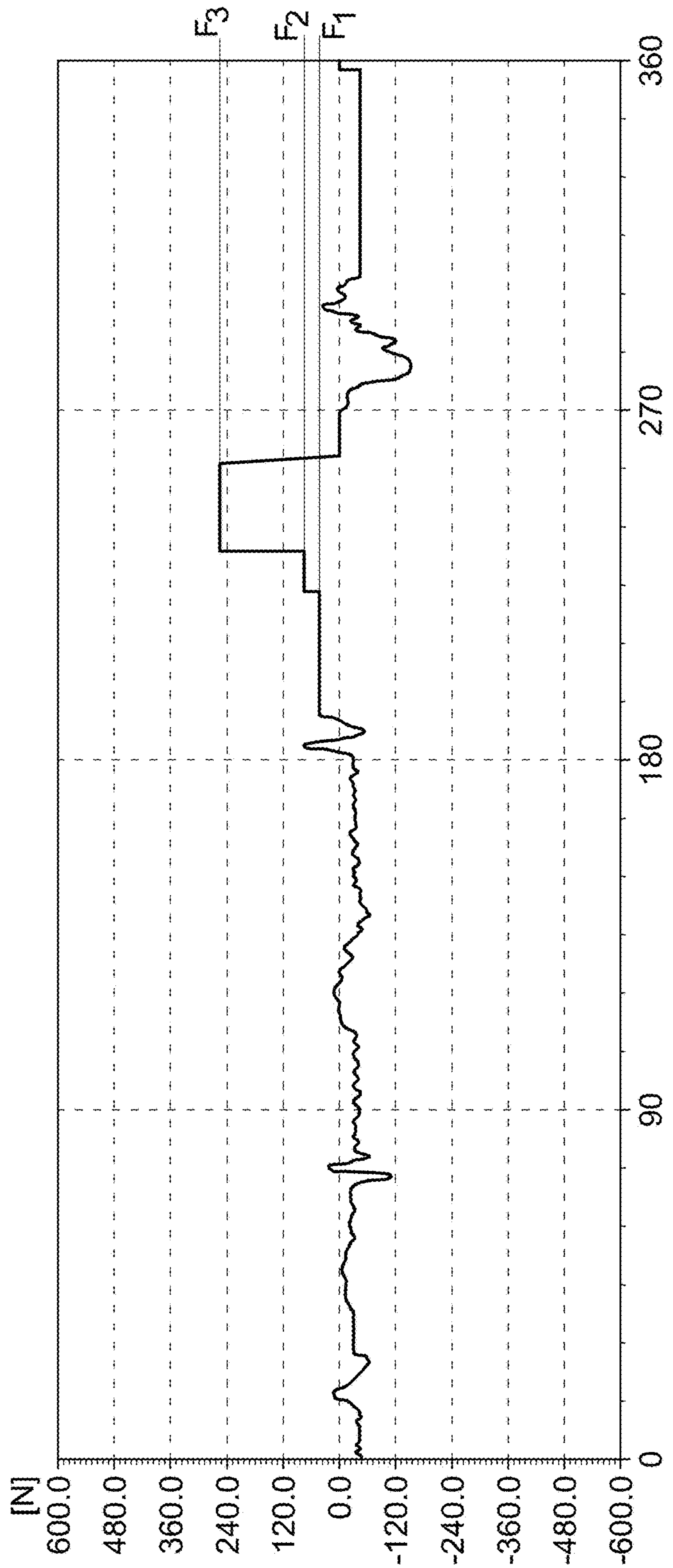
FIG. 10 shows the variation of the axial stress force exerted on said receptacle along the vertical axis as a function of the angular position about the rotation axis of the carousel.
Figure 11:
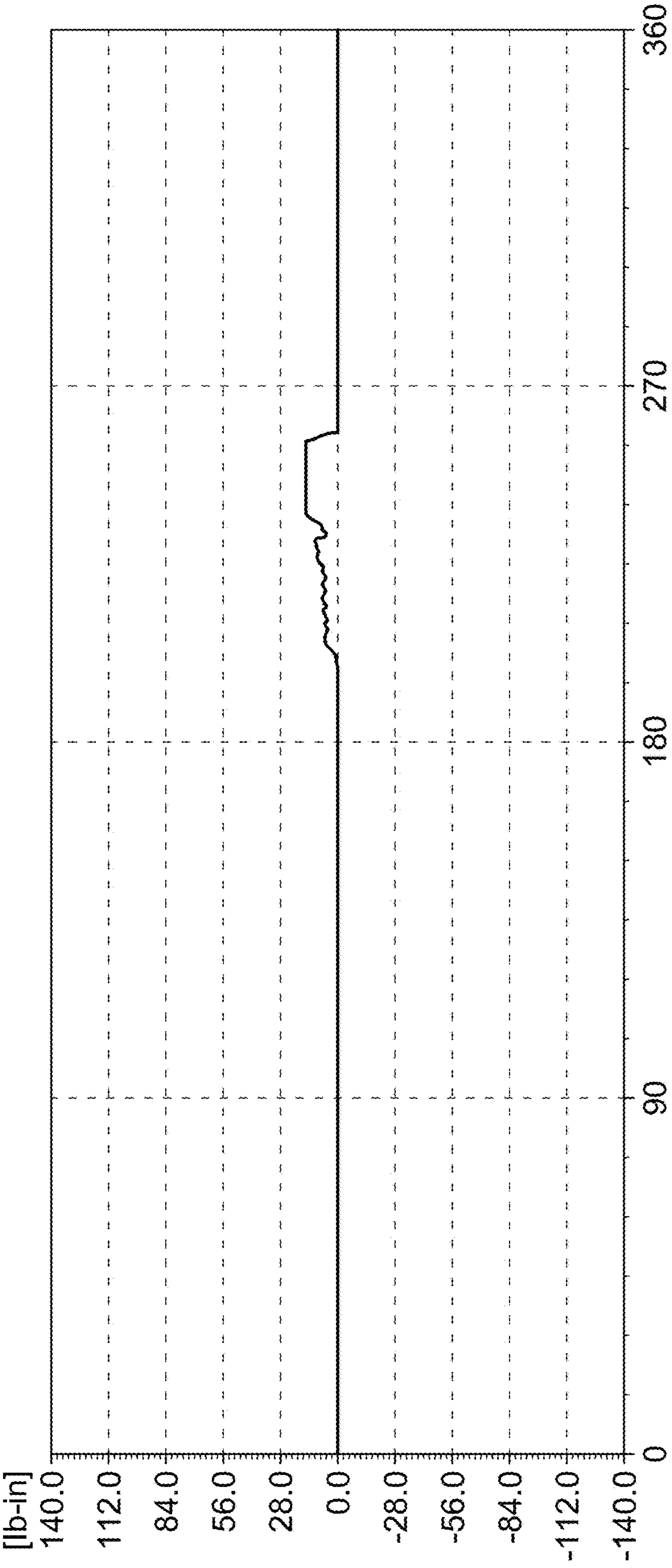
FIG. 11 shows the angular torque of the receptacle as a function of the angular position about the rotation axis of the carousel.
Figure 12:
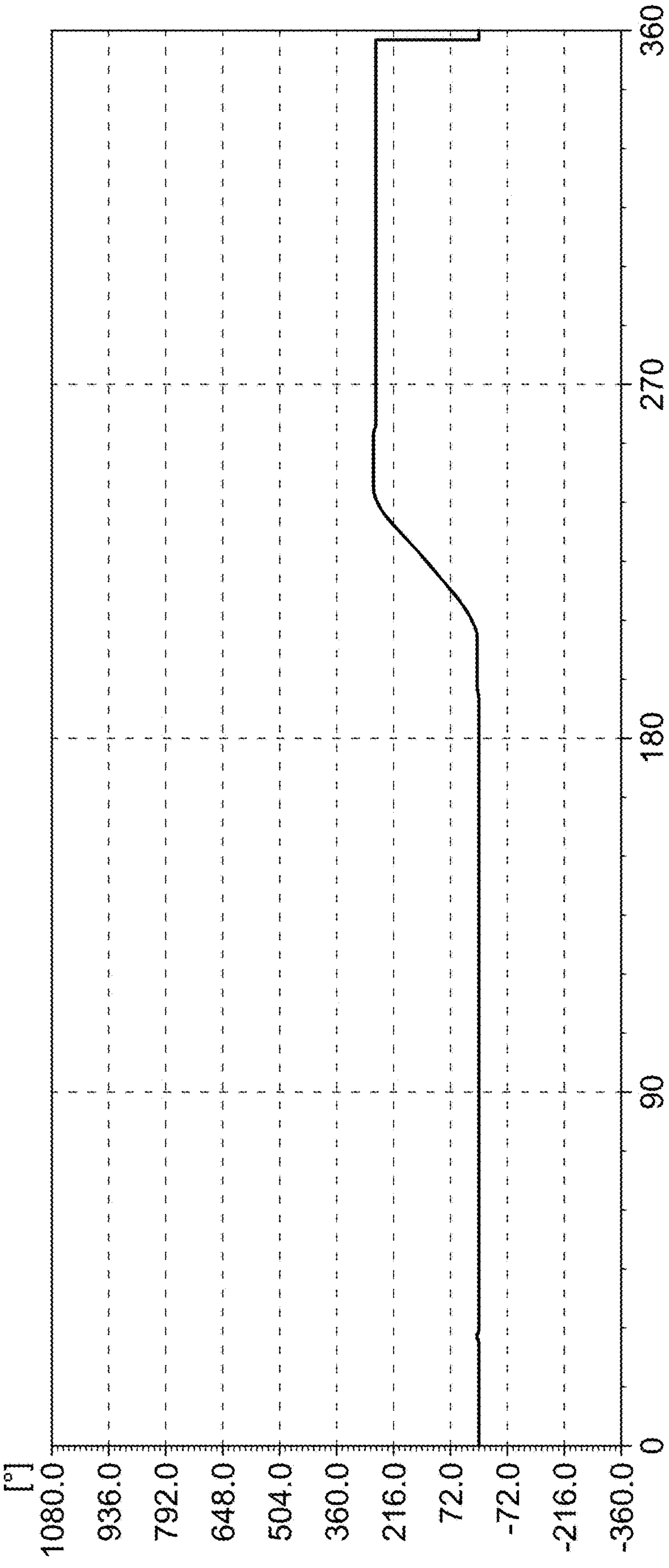
FIG. 12 shows the variation of the angular position about the vertical axis of the receptacle as a function of the angular position about the rotation axis of the carousel.

With reference to the figures, the apparatus for capping containers according to the disclosure, generally designated by the reference numeral 1, comprises at least one capping head 2 which can move between a position for picking up a cap 10 and a position for applying the cap 10 at a neck 12 of a container 11.

In particular, the neck 12 of the container 11 and the cap 10 have respective threadings for mutual engagement which are adapted to enable the coupling, via mutual rotation about its own axis, of the cap 10 with respect to the neck 12.

The capping head 2 defines a grip element 3, which is open on the side intended to be directed toward the container 11 to be capped.

Conveniently, the grip element 3 is, in use, open on the lower side.

The grip element 3 defines a receptacle 4 for the cap 10, and means for removable retention of the cap 10 within the receptacle 4.

Advantageously, the receptacle 4 is substantially cylindrical, and defines a tubular side wall that has a diameter that substantially corresponds to the diameter of the cap 10 to be accommodated.

According to a possible embodiment, the means for removable retention of the cap 10 comprise air suction means 5 which are functionally connected to the receptacle 4.

Preferably, the air suction means 5 comprise at least one duct 6, which is functionally connected to a suction chamber 7.

Likewise, the duct can furthermore be functionally connected, selectively, to an air input device, in order to be able to expel, on command, the cap 10 from the receptacle 4.

Basically, providing the means for removable retention using a duct connected to suction means makes it possible, on the one hand, to stably retain the cap 10 within the respective receptacle 4 during the movement of the capping head 2 and during the operations to screw the cap 10 onto the neck 12 of the container 11 and, on the other hand, to expel, by stopping the suction and, if required, blowing air through the duct, caps 10 that went unscrewed or were incorrectly seated inside the receptacle 4.

Obviously, there is no reason why conventional means for removable retention cannot be used, such as for example holding balls or rings.

The grip element 3 is functionally associated with first motor means 40, which are designed to screw the cap 10 accommodated in the respective receptacle 4 onto the neck 12 of the container 11.

According to the present disclosure, the apparatus 1 comprises second motor means 50, which are adapted to actuate the movement of the grip element 3 in an axial direction.

The apparatus 1 is further provided with a control and actuation unit 70 which is functionally connected to the first motor means 40 and to the second motor means 50.

The control and actuation unit 70 is configured to receive in input a plurality of data items which comprises:

- a first data item relating to the angular position of the receptacle 4;
- a second data item relating to the axial position of the receptacle 4;
- a third data item relating to the axial stress force applied to the receptacle 4 and
- a fourth data item relating to the rotational torque to which the receptacle 4 is subjected.

The control and actuation unit 70 is configured to actuate the first motor means 40 and the second motor means 50 as a function of the variation of the value over time of the plurality of data items listed above.

Conveniently, the control and actuation unit 70 is configured to actuate a first axial downward movement of the receptacle 4 in order to bring the receptacle 4 into contact with the neck 12 of the container 11.

The descent of the receptacle 4, and as a consequence of the cap 10, toward the neck 12 occurs at a constant and controlled speed. The approach and the contact take place with rotation stopped and idle.

In this approach step, the force of the second motor means 50 is limited to a first value F1 which can be configured so that the contact occurs at most with this pushing force F1.

Contact is detected from the increase in the resisting force of the second motor means 50, at the value F1.

Once a time interval has elapsed after contact, the first motor means begin rotating the cap 10 in agreement with the direction of the threading. Once the two threadings are engaged, the cap 10 begins to descend under the thrust of the second motor means 50, again with applied force substantially equal to F1.

While the cap 10 is being screwed onto the neck 12, the contrasting torque increases, so that upon reaching a presettable vertical elevation, the pushing force value passes from the first contact value F1, to a second value F2, conveniently higher.

The angular position continues to increase until it is stopped, once the cap 10 is completely screwed onto the neck 12. At this point the contrasting torque increases to the preset torque limit that it is intended to apply. This torque value is maintained for a preset time interval.

As the contrasting torque increases during the screwing, the vertical load F2 may not be sufficient to ensure that the neck 12 does not slip relative to the grip teeth 12*a* arranged below the threading defined on the neck 12 of the container 11.

For this reason a third stage of vertical load F3 is necessary, using the second motor means 50.

Passing from the application of load stage F2 to load stage F3 can be done in three specific cases:

- a preset vertical elevation has been reached;
- after a preset length of time: i.e., once a preset time limit has elapsed after the cap-threading contact;
- on the basis of the derivative of the contrasting torque.

This third condition is particularly useful if the cap has sprues for connection to the seal of guarantee (band) that are particularly susceptible to breakage.

Figure 13:
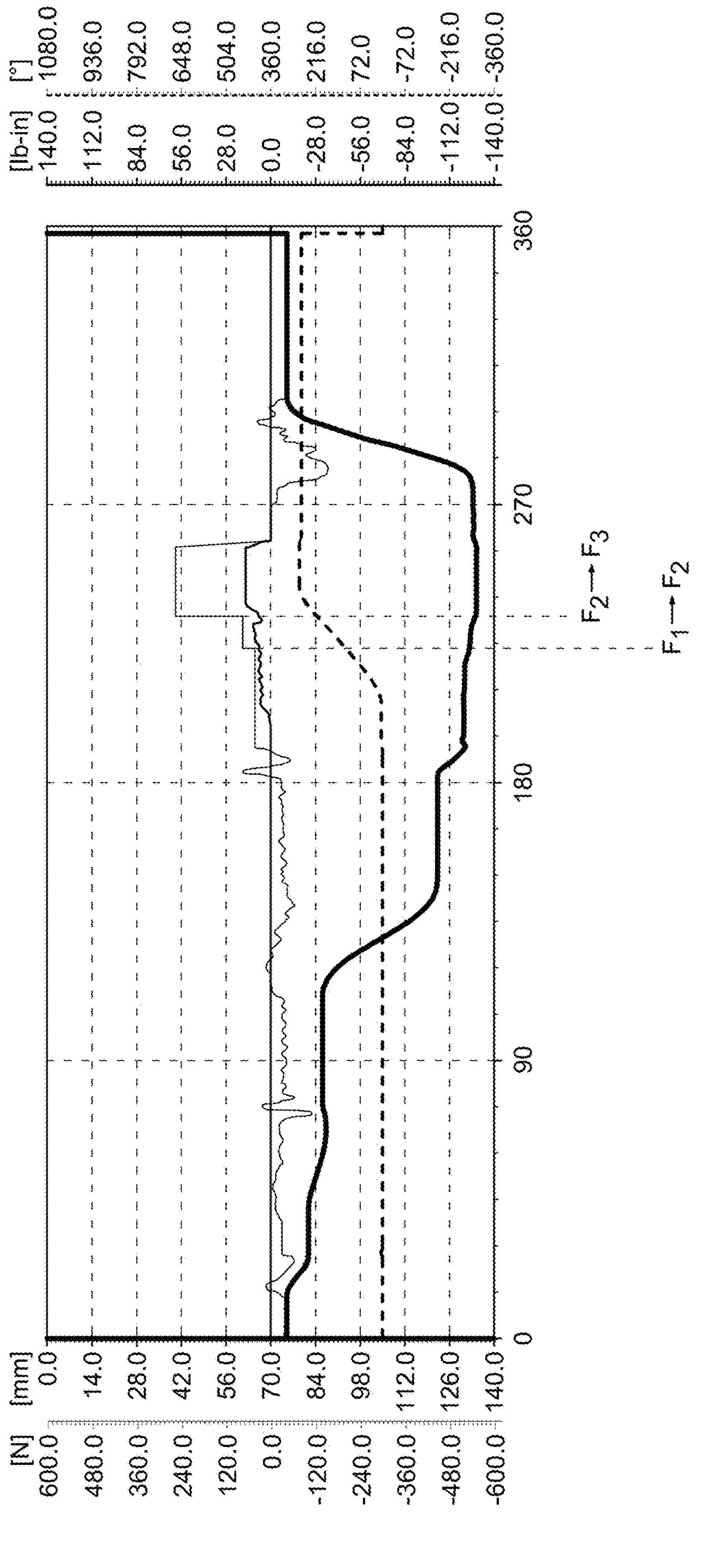
FIG. 13 shows, overall, the variation of the set of data items shown separately in FIGS. 9 to 12 as a function of the angular position about the rotation axis of the carousel.

It has been found experimentally that if the force F3 is applied before the band of the cap has passed through the seal-breaking ring of the threading, some sprues may break. It has also been found that the seal-breaking ring passing through the seal of guarantee is clearly identified by a sudden drop in the contrasting torque. For this reason, advantageously, the step of increasing the axial force from F2 to F3 is executed upon reaching a 10 preset value of the derivative of the contrasting torque curve (as shown in FIG. 13).

It is possible to have the first motor means 40 configured to perform a first rotation in the direction opposite to the direction of screwing of the cap 10.

In particular, such first rotation makes it possible to correctly place caps 10 within the receptacle 4 which may have been placed incorrectly.

Furthermore, such first rotation can be done in order to identify the angular position of the start of the threading defined on the neck 12.

The first motor means 40 are likewise configured to execute, after the first rotation, a second rotation in the direction of screwing of the cap 10 which is designed to ensure the correct tightening torque of the cap 10 on the neck 12 of the container 11.

The first motor means 40 are associated with a control device which is configured to recognize, during the first rotation in the direction opposite to the direction of screwing of the cap 10, the angular position of the start of the threading defined on the neck 12.

Such control device is configured to acquire the peak of downward acceleration of the grip element 3 directly from the second motor means 50 during the first rotation.

In this operating mode, a defined screwing angle can therefore be applied, or advantageously the application can be performed again with contrasting torque maintained for a preset time interval, and obtain the angle actually applied from feedback. This value can be used as a control parameter for correct capping if it is contained within a determined range.

According to a particularly important aspect of the present disclosure, the first motor means 40 are functionally connected to a control and actuation unit 70.

With reference to the embodiment shown in the FIGS. 1 to 4, the apparatus 1 comprises a conventional carousel structure 30.

In particular, the carousel structure 30 is provided with a plurality of capping heads 2 which can move along the peripheral region of the carousel structure 30 in an upper region and in synchrony with a respective support 31 for a container 11 to be capped.

The carousel structure 30 is advantageously supported by a fixed framework and is operationally associated, in a way that is per se known, with a feeding star conveyor 70 for the containers 11 to be capped, and with an unloading star conveyor 71 for the capped containers.

The capping heads 2 have the respective grip element 3 which can move along an axial direction 100 in order to pick up a respective cap 10 in a pickup position and to then bring said cap to a position of resting on the neck 12 of the container 11.

The first motor means 40 and the second motor means 50 comprise a respective brushless motor respectively with a rotary motion about the axis and with a linear motion in an axial direction.

By virtue of the particular shape structure of the grip element 3, and also of the axial movement via the second motor means 50, the inertia of the capping head 2 is extremely low compared to conventional solutions.

This makes it possible to move the grip element 3 very rapidly, and as a consequence, as soon as the container 11 enters the carousel in order to be positioned along the work path of the capping head 2, which corresponds to the change of direction of the container 12, the grip element 4 with the cap accommodated can be lowered immediately onto the neck 12 of the container 10, thus preventing the egress of product from the container 11 as a result of the change of direction.

Conveniently, cooling means are provided for the control and actuation unit 70, for the first motor means 40 and/or for the second motor means 50.

The cooling means comprise, for example, a blower 60 which is connected in output to a delivery duct 61 of the air toward the region of the carousel 30 that accommodates the first motor means 40 and/or the second motor means 50 and any actuation drivers.

This region is, preferably, closed by a closure housing so that the air produced by the blower can keep it at a slight positive pressure.

An outlet flue in the upper flange of the turret, conveniently dimensioned, allows the evacuation of the hot air and therefore the disposal of excess heat. The blower 60 is actuated using a feedback inverter based on the detected temperatures of capping actuators and motors (and in particular of the first motor means 40 and second motor means 50). Actuation of the blower can also be direct, without an inverter.

It has been found that cooling the actuation systems ensures an extremely reliable operation of the first and/or of the second motor means. The delivery duct 61 extends, preferably, at the axis of the carousel 30: in this manner, both the blower 60 and the delivery duct 61 can be fixed with respect to the supporting frame of the carousel 30.

Obviously there is no reason why the blower 60 cannot rotate integrally with the carousel 30.

Advantageously, the blower 60 can be associated with heat exchange means, which comprise for example a heat exchanger, and are configured to lower the temperature of the air sent to the delivery duct.

According to a further aspect of the present disclosure, the apparatus 1 comprises a device for measuring the temperature of the caps 10, which is functionally connected to the control and actuation unit.

In this regard, the control and actuation unit is configured to modify the operating parameters of the capping head 2 as a function of the temperature measured by the device for measuring the temperature of the caps 10.

By way of example, the device for measuring temperature comprises a pyrometer.

Conveniently, the operating parameters intended to be modified, as the temperature of the caps measured by the device for measuring temperature varies, comprise the tightening torque of the cap 10.

The operation of the apparatus 1 for capping containers, according to the disclosure, is the following.

If the apparatus 1 has a carousel structure 30, the general operation is substantially analogous to known apparatuses, and the caps 10 to be used are fed to the apparatus 1 in order to be sequentially picked up by each capping head 2 at a pickup position defined along the peripheral region of the carousel structure 30.

The containers 11 to be capped are also fed using means for feeding and transfer to the supports arranged below the respective capping heads 2.

When each capping head 2 is arranged above the pickup position, this is lowered in order to pick up a respective cap 10 and is then raised during its movement along the peripheral region of the carousel structure 30. A subsequent lowering brings the grip element 4 into contact with the top portion of the neck 12 of the container 11.

In such position, the first motor means 40, after the second motor means 50 have also actuated the steps of lowering and raising the capping head 2, proceed to make the receptacle 4 rotate in the direction of screwing of the cap 10.

Simultaneously, the actuation and control device 70 actuates the first motor means 40 in order to execute the rotation in the direction of screwing of the cap 10 which is designed to ensure the correct tightening torque of the cap 10 on the neck on the container 11.

In practice it has been found that the disclosure fully achieves the intended aim and objects by providing a capping apparatus 1 that is extremely efficient and which appreciably reduces the elements in motion and therefore subject to wear.

This result is obtained, in particular, by virtue of the use of motor means with movement both linear and rotating.

The disclosure thus conceived is susceptible of numerous modifications and variations, all of which are within the scope of the appended claims. Moreover, all the details may be substituted by other, technically equivalent elements.

In practice the materials employed, provided they are compatible with the specific use, and the contingent dimensions and shapes, may be any according to requirements and to the state of the art.

What is claimed is:

1. An apparatus for capping containers comprises: at least one capping head configured to move between a first position for picking up a cap and a second position for applying said cap at a neck of a container, said at least one capping head defining a grip element which is open on a side intended to be directed toward the container to be capped, said grip element defining a receptacle for said cap and means for removable retention of said cap within said receptacle, said grip element being functionally associated with first motor means which are designed to screw the cap accommodated in the respective receptacle onto the neck of said container, and further comprising second motor means which are adapted to actuate a movement of said grip element in an axial direction, a control and actuation unit being provided which is functionally connected to said first motor means and to said second motor means and is configured to receive in input a plurality of data items which comprises: a first data item comprising the angular position of said receptacle, a second data item relating to an axial position of the receptacle, a third data item relating to an axial stress force applied to said receptacle, and a fourth data item relating to a rotational torque to which said receptacle is subjected, said control and actuation unit being configured to actuate said first motor means and said second motor means as a function of a variation of a value over time of said plurality of data items.

2. The apparatus according to claim 1, wherein said control and actuation unit is configured to actuate a first axial downward movement of said receptacle to bring said receptacle into contact with the neck of said container with a maximum axial force that is lower than a first value F1, and a first angular movement of said receptacle as a function of a trend of the fourth data item relating to the rotational torque to which said receptacle is subjected.

3. The apparatus according to claim 2, wherein said control and actuation unit is configured to actuate said first motor means so as to apply a maximum axial force that is lower than a second value F2 once a preset value of the fourth data item, relating to the rotational torque to which said receptacle is subjected for a second angular movement of said receptacle, has been reached.

4. The apparatus according to claim 3, wherein said control and actuation unit is configured to actuate said first motor means to apply a maximum axial force that is lower than a third value F3 as a consequence of an event chosen from the group consisting of:

reaching of a preset vertical elevation by said receptacle;

once a preset time limit has elapsed after the cap-threading contact; and on the basis of a trend of a derivative of a function of the contrasting torque.

5. The apparatus according to claim 1, further comprising cooling means for said first motor means and/or said second motor means which comprise a blower which is connected in output to a delivery duct of air toward a region of a carousel structure that accommodates said first motor means and/or said second motor means.

6. The apparatus according to claim 5, wherein said carousel structure has a plurality of capping heads configured to move along the peripheral region of the carousel structure in an upper region and in synchrony with a respective support for a container to be capped, said plurality of capping heads having the respective grip element configured to move along an axial direction in order to pick up a respective cap in a pickup position and to then bring said cap to a position of resting on the neck of said container.

7. The apparatus according to claim 5, wherein said second motor means are configured to bring said cap into engagement with the neck of a respective container within an angle of less than 20° about an axis of said carousel structure, with respect to an angular position of passage of said container from a feeding star conveyor to said support of the containers.

8. The apparatus according to claim 1, wherein said means for removable retention of said cap comprise air suction means which are functionally connected to said receptacle.

9. The apparatus according to claim 8, wherein said air suction means comprise at least one duct, said at least one duct being functionally connected to air input means which are adapted to expel, on command, said cap from said receptacle.

10. The apparatus according to claim 1, wherein said first motor means are configured to perform a first rotation in a direction opposite to a direction of screwing of said cap and a second rotation in a direction of screwing of said cap which is designed to ensure a correct tightening torque of said cap on the neck of said container.

11. The apparatus according to claim 1, wherein said first motor means and/or said second motor means comprise a respective brushless motor respectively with a rotary motion about said axis and with a linear motion in an axial direction.

12. The apparatus according to claim 1, further comprising a measurement device configured for measuring a temperature of said caps which is functionally connected to said control and actuation unit, said control and actuation unit being configured to modify operating parameters of said at least one capping head as a function of a temperature measured by said measurement device.

* * * * *